June 6, 1967  E. WODARKA  3,323,384

FRICTIONAL GEARING TRANSMISSION

Filed March 30, 1965  2 Sheets-Sheet 1

INVENTOR:
EWALD WODARKA
BY
*Barrett, Bell, Seltzer, Park & Heard*
ATTORNEYS

June 6, 1967  E. WODARKA  3,323,384

FRICTIONAL GEARING TRANSMISSION

Filed March 30, 1965  2 Sheets-Sheet 2

INVENTOR:
EWALD WODARKA
BY
Parrott, Bell, Seltzer, Park & Heard
ATTORNEYS

United States Patent Office 3,323,384
Patented June 6, 1967

3,323,384
FRICTIONAL GEARING TRANSMISSION
Ewald Wodarka, Solothurnerstr. 96, Munich, Germany
Filed Mar. 30, 1965, Ser. No. 443,856
8 Claims. (Cl. 74—196)

This invention pertains to a frictional gearing transmission and more particularly to an improved continuously variable ratio transmission of the frictional gearing type.

Frictional gearing transmissions have found ready acceptance where the power or torque to be transmitted is sufficiently low so that slippage of the frictionally engaging surfaces of the transmission will not occur. Frictional transmissions are particularly found advantageous where a continuously variable transmission is desired; that is, where the ratio of rotational movements of the input and output shafts is to be varied continuously rather than by a step-by-step progression, as is typical with a positive engagement transmission such as that provided with toothed gears.

Continuously variable ratio frictional transmissions, as presently used, are of two types. A first type uses a single frictional disc member, mounted on a shaft for rotation about a predetermined first axis, and a friction roller member carried on a shaft for rotation about a predetermined second axis perpendicular to the first axis and for translation along the second axis. The friction roller member in this type of continuously variable ratio transmission, although mounted for translation along its shaft, is secured to the shaft for rotation therewith. When one shaft of this type of transmission is rotated, the other shaft is driven in rotation at a speed ratio determined by the displacement of the friction roller member from the first axis about which the disc member rotates, as the frictional engagement of the disc member and roller member requires that the peripheral linear speeds of the two members be matched for the point of contact.

The second conventional type of continuously variable ratio frictional transmission typically employs two disc members having parallel planar friction faces and being mounted for rotation about respective first and second axes, and a friction roller member disposed between the disc members and mounted for rotation about and translation along a third axis perpendicular to the first and second axes. With this type, the friction roller member is typically free to rotate relative to the shaft on which it is carried for translational movement, and the ratio of transmission between the two disc members is determined by the relative displacement of the roller member from the centers of rotation of the two discs, with which it is in frictional engagement.

The usefulness of any continuously variable ratio frictional transmission is limited by certain difficulties universally encountered with such transmissions. Primarily, these difficulties stem from failure to maintain suitable frictional engagement between the various rotating members of the transmission, with resulting slippage at the points of engagement and distortion of the desired ratio for the transmission. Further, the conventional types of continuously variable ratio frictional transmission provide a correlation of rotational speeds only between two shafts.

The frictional gearing transmission of this invention avoids the difficulties of conventional continuously variable ratio frictional transmissions by providing more than two correlated rotational speeds and by assuring the desired frictional engagement to maintain the selected ratio of correlation by avoiding slippage between the frictional members. This is accomplished by providing novel loading and balancing means for forces acting on the rotating members of the transmission and by securing more than two of the frictionally engaging members to shafts for rotation of the members therewith.

Accordingly, it is an object of this invention to provide an improved continuously variable ratio frictional gearing transmission which avoids the difficulties or deficiencies of conventional types of such transmissions and provides more than two correlated rotational movements.

A further object of this invention is to assure proper correlated rotational movement of the members of a continuously variable ratio frictional gearing transmission by providing loading and balancing forces to maintain the required frictional engagement of the rotating members of the transmission.

A more specific object of this invention is to correct any unbalance of loading forces present on a given member of a continuously variable ratio frictional gearing transmission by applying balancing forces to such a member.

Some of the objects of this invention having been stated, other objects will appear as the description proceeds, when taken in connection with the accompanying drawings, in which—

Figure 1:
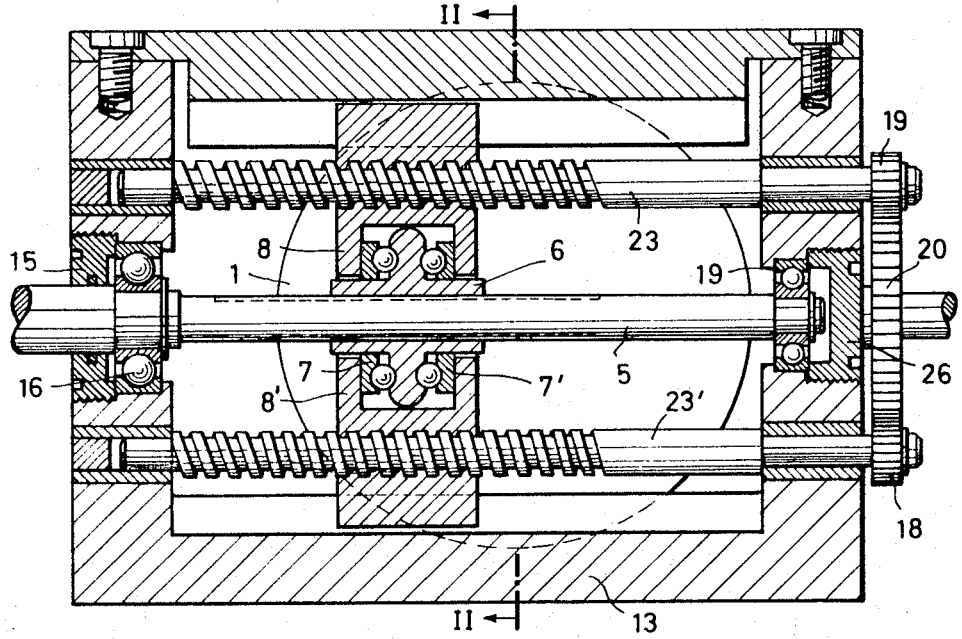
FIGURE 1 is a longitudinal sectional view of a continuously variable ratio frictional gearing transmission constructed in accordance with the present invention.

Broadly, the continuously variable ratio frictional gearing transmission of this invention uses two friction disc members mounted for rotation about predetermined parallel respective first and second axes and supported with the planar friction faces of the disc members spaced a predetermined distance apart. A third shaft is positioned parallel to the frictional faces and perpendicular to the first and second axes, and supported for rotation on a predetermined third axis. A friction roller member is operatively connected to the third shaft and the two disc members, for rotation with and translation along the shaft while maintaining continual frictional contact with the disc members. Each or any of the three shafts is used as an input or output for rotational movement at a selected correlation to the rotational movement of the other frictional members, with the correlational movement being determined by the displacement of the frictional roller member from the axes of rotation of the disc members. Resilient loading forces are provided by suitable means, for assuring continuous effective frictional contact between the various rotating members and for balancing the forces present on the disc members. Two specific forms of such continuously variable ratio frictional gearing transmissions are shown in the drawings and will now be described in detail.

Figure 2:
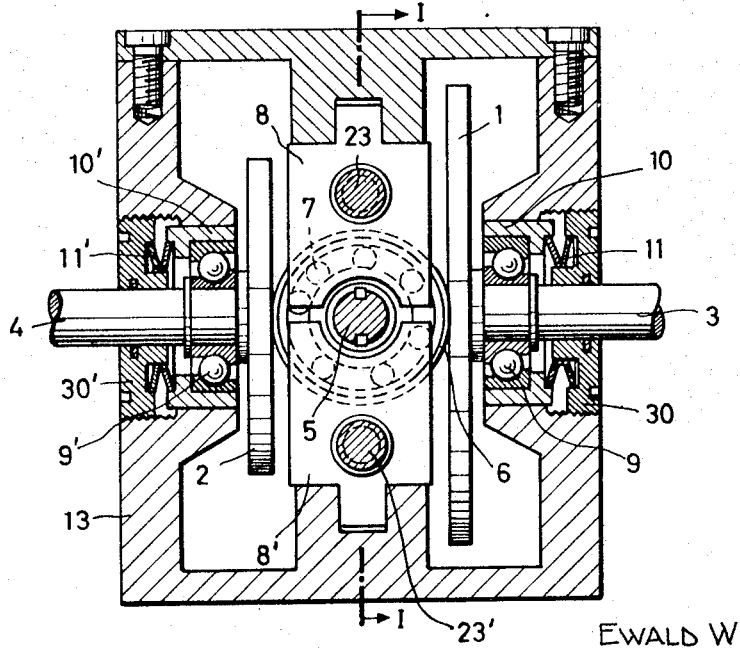
FIGURE 2 is a sectional view of the transmission of FIGURE 1, as taken as indicated by the line 2—2 in FIGURE 1.
Figure 3:
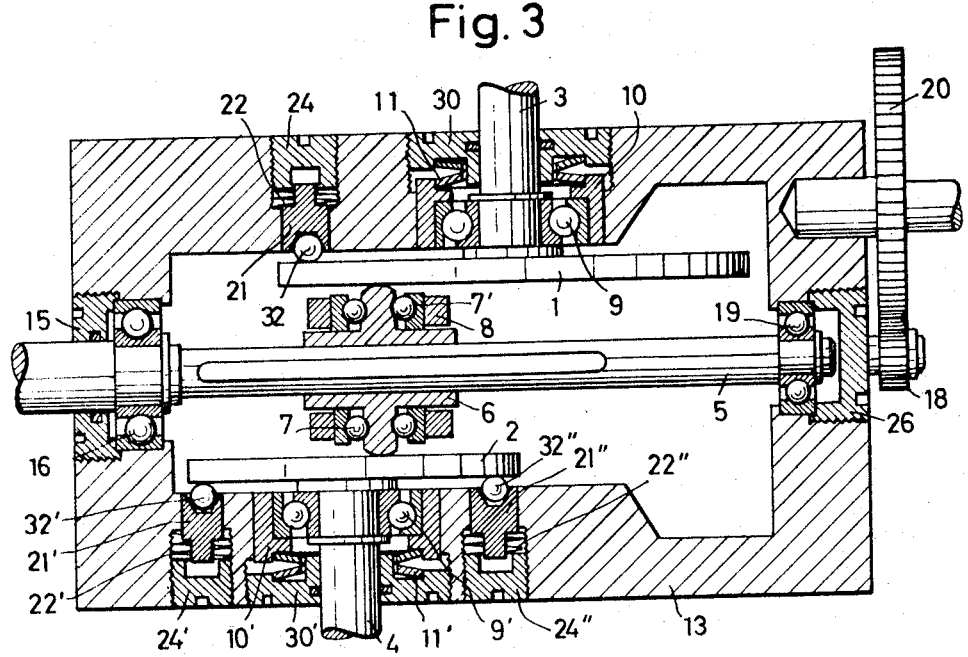
FIGURE 3 is a longitudinal view perpendicular to the views of FIGURES 1 and 2 of one form of continuously variable frictional ratio gearing transmission constructed in accordance with this invention.

A first form of continuously variable ratio frictional gearing transmission constructed in accordance with this invention is shown in FIGURES 1–3. There, such a frictional gearing transmission is shown to have first and second shafts, indicated as 3, 4 respectively. Each shaft is supported for rotational movement about a corresponding respective axis by a suitable anti-friction bearing 9, 9' which in turn is mounted in an axially slidable bearing sleeve member 10, 10' for purposes to be made more clear hereinafter. The first and second axes, on which the shafts 3, 4 are mounted for rotation, are parallel, and as best shown in FIGURE 3, spaced apart a predetermined distance. At the inner terminal end of each of the first and second shafts 3, 4 is secured a disc member 1, 2, and each disc member has a planar friction face extending perpendicular to the first and second axes. The two disc members 1, 2 are mounted to place the friction faces parallel and spaced apart a predetermined distance. The outer terminal ends of the shafts 3, 4 extend outwardly through a transmission housing 13, and are available for use as inputs or outputs of rotational movement to be passed through the transmission.

In order to transmit rotational movement by frictional engagement and in order to provide a continuously variable ratio for the frictional gearing transmission of this invention, a friction roller member 6 is provided which frictionally engages the two disc members 1, 2. The friction roller member 6 is secured to a third shaft 5 for rotation therewith and for translation thereon. The third shaft 5 is supported, by anti-friction bearings 16, 19 for rotation about a third axis parallel to the friction faces of the disc members 1, 2, and the outer end of the third shaft 5 extends outwardly through the transmission housing 13 to provide a third input or output for rotational movement. Preferably, the third shaft 5 extends along a radial line of both disc members 1, 2, in order to provide the most advantageous frictional engagement of the three transmission members 1, 2, 6.

In order to provide a continuously variable ratio for the transmission of rotational movement through the frictional gearing transmission of this invention, means are provided for translating the friction roller member 6 along the third shaft 5. This means is shown most clearly in FIGURES 1 and 2, where a carrier member 8 engages the friction roller member 6 through suitable anti-friction bearing means 7, 7'. Two threaded spindles 23, 23' are supported for rotational movement about predetermined axes parallel to the third axis, as defined by the third shaft 5, and threadingly engage the carrier member 8. A suitable gear train including a drive gear 20 and driven gears 18, 19 secured to the spindles 23, 23', is provided for simultaneously rotating the two threaded spindles to cause translation of the carrier member 8 and friction roller member 6. As will be readily understood by persons familiar with continuously variable ratio frictional gearing transmissions of the conventional second type, the ratio of transmission between the first and second shafts 3, 4 is determined by the radial displacement of the friction roller member 6 with respect to the first and second axes, which is in turn determined by the translation of the carrier member 8 along the two threaded spindles 23, 23'. Thus, the ratio of transmission between the first and second shafts 3, 4 may be continuously varied by incremental translational movements of the carrier members 8 and frictional roller members 6. Additionally, in the continuously variable ratio frictional gearing transmission of this invention, the ratio of rotation of the third shaft 5 to the first and second shafts 3, 4 is continually varied by the varying peripheral speed of the friction roller member 6 as translation of that member occurs. Thus, three input or output shafts for the transmission of this invention are provided.

In order to assure adequate frictional engagement of the three frictionally engaged members 1, 2, 6 of the transmission of this invention, means are provided for applying loading forces along corresponding axes of rotation to at least one and preferably both of the disc members 1, 2. Such means are shown most clearly in FIGURES 2 and 3. There, it may be seen that the axially movable bearing sleeve members 10, 10' are engaged by cup spring members 11, 11', which encircle a corresponding one of the first and second shafts 3, 4. Abutment members 30, 30' are threadingly engaged to the transmission housing 13 so as to be mounted for variable axial displacement from the bearing sleeve members 10, 10' to thus vary the axial distances between the abutment members 30, 30' and the bearing sleeve members 10, 10'. Understandably, decreasing the axial distance between an abutment member and the corresponding bearing sleeve member will compress the corresponding spring member and apply an increasing loading force along the axis of the corresponding first and second shaft to bias the corresponding disc member 1 or 2 inwardly into contact with the friction roller 6, to assure continuing adequate frictional engagement of the friction members 1, 2, 6 of the transmission.

In order to balance the bending moment forces which would otherwise be developed in the disc members 1, 2 by the forces developed by the loading means, in view of contact of the disc member with the friction roller member 6 at some radial distance displaced from the corresponding axis where the loading forces applied, this invention provides balancing means for applying a balancing force to the loaded disc member. One form of such a balancing means is shown in FIGURE 3, where the first and second axes are misalined. With specific reference to the balancing means for the upper disc member 1 shown there, the loading means comprises a piston member 21 mounted for axial movement only parallel to the axes of the first and second shafts. That is, for the upper disc member 1, the piston member 21 moves axially parallel to the axis of rotation of the shaft 3, and is spaced a predetermined distance from the corresponding shaft 3. The piston member 21 carries a rotatable means 32, preferably a ball member, adapted to engage a rearward face of the corresponding disc member 1, and transmit a balancing loading force to that disc member. The balancing loading force is provided by a spring 22, disposed intermediate of a threaded abutment member 24 and the axially movable piston member 21. By adjustment of the threaded abutment member 24, the force applied by the spring 22 against the piston member 21 for transmission to the disc member 1 by the rotatable ball 32 may be varied in a manner similar to the manner in which the axial loading force applied along the corresponding shaft 3 may be varied. Thus, any bending moment force developed by the displacement between the loading forces applied along the first axis and applied at the friction roller member 6 is balanced by a balancing force applied by the rotatable ball 32 outwardly of the point of contact with the friction roller member 6. Similar piston, rotatable means, and spring constructions operating on the other disc member 2 are illustrated, indicated with prime numerals, and are similar to that described above.

Figure 4:
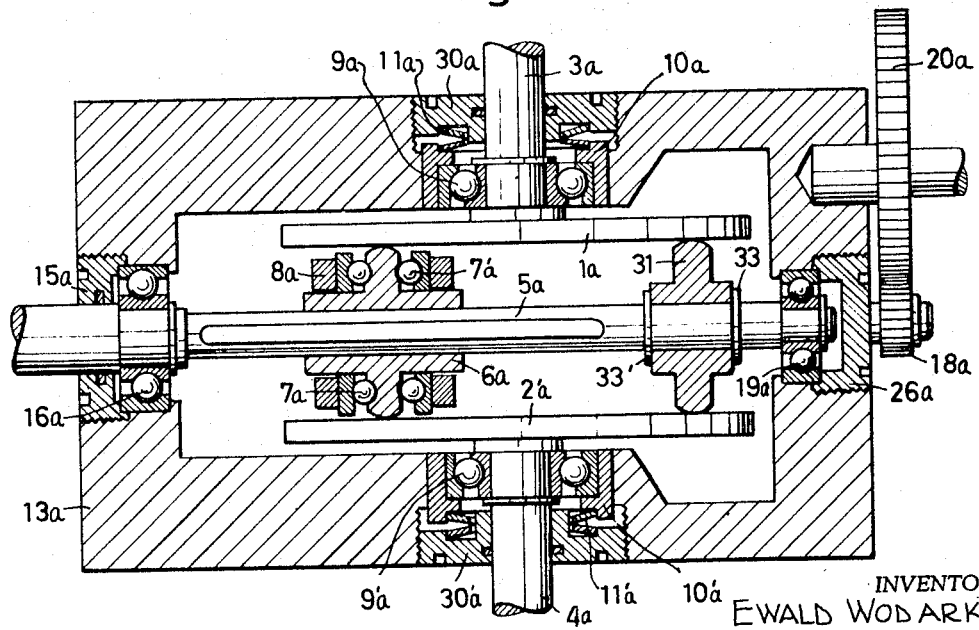
FIGURE 4 is a view similar to FIGURE 3 of a second form of continuously variable ratio frictional gearing transmission constructed in accordance with this invention.

A second form of continuously variable ratio frictional gearing transmission and balancing means is shown in FIGURE 4, where elements corresponding to the elements of the first form of transmission are designated by corresponding numerals including the subscript *a*. Due to the basic similarity between the transmission of FIGURE 4 and that of FIGURES 1–3, a detailed description is not considered necessary, but it should be noted that, in the transmission of FIGURE 4, the first and second shafts 3*a*, 4*a*, are alined.

In the second form of transmission, as shown in FIGURE 4, the balancing means is an idler friction roller member 31, carried by the third shaft 5*a* for free rotation on that shaft. The idler friction roller 31 is secured, by collars 33, 33' or by some other suitable means, against axial movement along the third shaft 5*a*, and in a position at which its contact with the friction disc members 1*a*, 2*a* is equidistant from the corresponding first and second axes. This is required in order to match the peripheral speeds of the disc members and the idler roller member, to avoid detrimental slippage between those members. The idler friction roller 31 and the driving friction roller 6*a* have the same diameter, to thus require parallelism at all times between the disc members 1*a* and 2*a*, and balance any bending moment which would otherwise be generated in the disc members 1*a*, 2*a* by the loading means including the bearing sleeve members 10a, 10a' spring means 11a, 11a' and abutment members 30a, 30a'.

With either form of continuously variable ratio frictional gearing transmission as described above, the torque limitations for transmission of rotational movement can be adjusted from outside the transmission housing 13 without interrupting the use of the transmission, by means of the adjustable abutment members, as 30, acting on the spring means, as 11.

In the first form of continuously variable ratio frictional gearing transmission of this invention as illustrated in FIGURES 1–3 and described above, the transmission may be driven through the friction roller member or through either disc member. In either event, two different transmission ratios result, either transmitted between the roller shaft and the two disc members or from one disc member to the roller shaft and the other disc member. Where the second form of continuously variable ratio frictional gearing transmission of this invention is used, as illustrated in FIGURE 4 and described above, the two friction discs always rotate at the same speed, with the rotational movement of the third shaft 5a reflecting the continuously variable ratio.

It is therefore considered that continuously variable ratio frictional gearing transmissions have been illustrated and described which avoid the difficulties and deficiencies of conventional transmissions of this type by providing more than two input and output shafts and by assuring continuous and adequate frictional engagement of the transmission members through the application of loading and balancing forces to the disc members of the transmission.

In the drawings and specification there have been set forth preferred embodiments of the invention and, although specific terms are employed, they are used in a generic and descriptive sense only and not for purposes of limitation, the scope of the invention being defined in the claims.

What is claimed is:

1. A frictional gearing transmission adapted to provide variably correlated rotational movement for more than two shafts comprising
    first and second shafts supported for rotation about predetermined parallel respective first and second axes, and for axial movement therealong
    first and second disc members, each disk member being secured to a terminal end of a corresponding one of said first and second shafts for rotation therewith and having a planar friction face extending perpendicular to said axes and spaced from the corresponding face of the other of said disc members,
    a third shaft supported for rotation about a predetermined third axis parallel to said friction faces,
    a friction roller member carried by said third shaft for rotation therewith and for translation therealong and adapted to engage said friction faces of said disc members to correlate the rotational movements of said members and corresponding shafts,
    translating means connected to with said friction roller member for controllably translating the same to vary the displacement of the same from said first and second axes to vary the correlation of the rotational movements of said shafts,
    loading means operatively associated with at least one of said first and second shafts for applying a variable resilient loading force along a corresponding one of said respective axes to urge said disc members and said friction roller member into controlled frictional engagement to assure rotational movement of each of said shafts at the desired correlation, and means for balancing bending moment forces acting on said disc members.

2. A frictional gearing transmission as claimed in claim 1 in which said translating means comprises
    at least one threaded spindle supported for rotation about an axis parallel to said third axis,
    a carrier member threadedly engaging said threaded spindle for translation therealong on rotation of said spindle and engaging said friction roller member for translating the same along said third shaft, and
    means for controllably rotating said threaded spindle to translate said carrier member and said friction roller member.

3. A frictional gearing transmission as claimed in claim 1 further comprising a bearing member supporting said at least one of said first and second shafts for rotation and being mounted for axial movement therewith and in which said loading means comprises:
    an abutment member axially spaced from said bearing member and mounted for adjustment to vary the distance therebetween, and
    spring means encircling said at least one of said first and second shafts intermediate said bearing member and said abutment member and engaging said bearing and abutment members to exert a resilient loading force therebetween.

4. A continuously variable ratio frictional gearing transmission adapted to provide variably correlated rotational movement for more than two shafts comprising:
    two bearing members mounted for axial movement,
    first and second shafts supported in corresponding bearing members for rotation about predetermined parallel respective first and second axes and for axial movement therealong,
    first and second disc members, each disc member being secured to a terminal end of a corresponding one of said first and second shafts for rotation therewith and having a planar friction face extending perpendicular to said axes and spaced from the corresponding face of the other of said disc members,
    a third shaft supported for rotation about a predetermined third axis parallel to said friction faces,
    a friction roller member carried by said third shaft for rotation therewith and for translation therealong and adapted to engage said friction faces of said disc members to correlate the rotational movements of said disc and roller members and corresponding shafts,
    a pair of threaded spindles supported for rotation about corresponding axes parallel to said third axis,
    a carrier member threadedly engaging said threaded spindles for translation therealong on rotation of said spindles and engaging said friction roller member for translating the same along said third shaft,
    means for controllably rotating said threaded spindles to translate said carrier member and said friction roller member to vary the displacement of said friction roller member from said first and second axes to vary the ratio of correlation of rotational movements of said shafts,
    abutment members axially spaced from corresponding ones of said bearing members and mounted for adjustment to vary the distance therebetween,
    spring means encircling each of said first and second shafts intermediate corresponding ones of said bearing members and said abutment members and engaging said corresponding bearing and abutment members to exert a resilient loading force therebetween along a corresponding one of said first and second axes to assure continuous frictional engagement of said disc and roller members, and
    means for balancing bending moment forces acting on said disc members.

5. A frictional gearing transmission as claimed in claim 4 in which said balancing means comprises:
    piston members supported for axial movement parallel to and spaced from a corresponding one of said first and second axes, means carried by each of said piston members and adapted to engage a corresponding one of said disc members for applying balancing forces to said corresponding disc member at a point spaced radially thereon from the corresponding one of said first and second axes, and spring means operatively engaging each of said piston members for applying an axial balancing force to the corresponding piston member for transmission by said last named means to said corresponding disc member.

6. A frictional gearing transmission as claimed in claim 5 in which said first and second axes are spaced apart a predetermined distance.

7. A frictional gearing transmission as claimed in claim 4 in which said balancing means comprises:
  a second frictional roller member carried by said third shaft for free rotation thereon at a predetermined position equidistant from said first and second axes.

8. A continuously variable ratio frictional gearing transmission adapted to provide variably correlated rotational movement for more than two shafts comprising:
  two bearing members mounted for axial movement,
  first and second shafts supported in corresponding bearing members for rotation about predetermined coaxial respective first and second axes and for axial movement therealong,
  first and second disc members, each disc member being secured to a terminal end of a corresponding one of said first and second shafts for rotation therewith and having a planar friction face extending perpendicular to said axes and spaced from the corresponding face of the other of said disc members,
  a third shaft supported for rotation about a predetermined third axis parallel to said friction faces,
  a friction roller member carried by said third shaft for rotation therewith and for translation therealong and adapted to engage said friction faces of said disc members to correlate the rotational movements of said disc and roller members and corresponding shafts,
  a pair of threaded spindles supported for rotation about corresponding axes parallel to said third axis,
  a carrier member threadedly engaging said threaded spindles for translation therealong on rotation of said spindles and engaging said friction roller member for translating the same along said third shaft,
  means for controllably rotating said threaded spindles to translate said carrier member and said friction roller member to vary the displacement of said friction roller member from said first and second axes to vary the ratio of correlation of rotational movements of said shafts,
  abutment members axially spaced from corresponding ones of said bearing members and mounted for adjustment to vary the distance therebetween,
  spring means encircling each of said first and second shafts intermediate corresponding ones of said bearing members and said abutment members and engaging said corresponding bearing and abutment members to exert a resilient loading force therebetween along a corresponding one of said first and second axes to assure continuous frictional engagement of said disc and roller members, and
  a second frictional roller member carried by said third shaft for free rotation thereon at a predetermined position equidistant from said first and second axes for balancing bending moment forces acting on said disc members.

References Cited

UNITED STATES PATENTS 3,218,875  11/1965  Myard _____ 74—197

FOREIGN PATENTS 12,331  4/1913  Great Britain.

ROBERT M. WALKER, *Primary Examiner.*

DAVID J. WILLIAMOWSKY, *Examiner.*

L. H. GERIN, *Assistant Examiner.*